United States Patent
Sugaya

(10) Patent No.: US 9,532,167 B2
(45) Date of Patent: Dec. 27, 2016

(54) MOBILE TERMINAL, LOCATION INFORMATION RELATED CONTENT PROVIDING SERVER, CONTENT PANEL DISPLAY METHOD, AND MOBILE TERMINAL PROGRAM

(71) Applicant: OPTiM Corporation, Saga-shi (JP)

(72) Inventor: Shunji Sugaya, Tokyo (JP)

(73) Assignee: OPTIM CORPORATION, Sagashi (JP)

( * ) Notice: Subject to any disclaimer, the term of this patent is extended or adjusted under 35 U.S.C. 154(b) by 0 days.

(21) Appl. No.: 14/492,217

(22) Filed: Sep. 22, 2014

(65) Prior Publication Data

US 2016/0007145 A1     Jan. 7, 2016

(30) Foreign Application Priority Data

Jul. 1, 2014  (JP) ................................. 2014-136341

(51) Int. Cl.
*H04W 24/00* (2009.01)
*H04W 4/02* (2009.01)

(52) U.S. Cl.
CPC ....................... *H04W 4/02* (2013.01)

(58) Field of Classification Search
CPC .................. H04W 64/00; H04L 29/08936
USPC ....................................... 455/456.3
See application file for complete search history.

(56) References Cited

U.S. PATENT DOCUMENTS

| | | | | |
|---|---|---|---|---|
| 2009/0102712 | A1* | 4/2009 | Heffez | 342/357.06 |
| 2010/0151880 | A1* | 6/2010 | Jang et al. | 455/456.1 |
| 2011/0043327 | A1* | 2/2011 | Baarman et al. | 340/5.8 |
| 2011/0260860 | A1* | 10/2011 | Gupta | 340/539.13 |
| 2012/0259851 | A1* | 10/2012 | Jia et al. | 707/737 |
| 2014/0006129 | A1* | 1/2014 | Heath | G06Q 30/0222 705/14.23 |
| 2014/0068778 | A1* | 3/2014 | Bhatia et al. | 726/26 |
| 2014/0155022 | A1* | 6/2014 | Kandregula | 455/405 |
| 2015/0079942 | A1* | 3/2015 | Kostka et al. | 455/411 |

FOREIGN PATENT DOCUMENTS

JP    2013-073420    4/2013

* cited by examiner

*Primary Examiner* — Santiago Garcia
(74) *Attorney, Agent, or Firm* — Lex IP Meister, PLLC

(57) ABSTRACT

A content is provided based on a questionnaire using a wireless communication. The mobile terminal 10 communicatively connected to a location information related content providing server 200 performs a wireless communication or a short-range wireless communication, acquires a wireless ID of a counterpart terminal used for the wireless communication or the short-range wireless communication, and transmits the acquired wireless ID or location information acquired from the wireless ID to the location information related content providing server 200. The mobile terminal 10 receives a content that is within a predetermined range from the transmitted location information or location information identified by the transmitted wireless ID from the location information related content providing server 200, displays a link to the content on a screen, and detects that the user physically has contact with the content by a short-range wireless communication or location information acquisition including a scheme using the wireless ID.

3 Claims, 10 Drawing Sheets

FIG. 9

<LOCATION INFORMATION RELATED CONTENT TABLE>

| LOCATION INFORMATION | AP IP ADDRESS | CONTENT NAME | CONTENT URL | WEIGHT |
|---|---|---|---|---|
| (33.1621,130.1851) | 200.138.9.1% | SAGA MUSEUM OFFICIAL | hiip://www.saga-art.jp | 3 |
| (33.1613,130.1849) | 200.168.9.% | SAGA ST SHOP INFO | hiip://www.saga-st.jp | 1 |
| (35.4021,138.3450) | 149.88.19.YY | OUTLET OFFICIAL | hiip://www.youtlet.com | 1 |
| ... | ... | ... | ... | ... |

FIG. 10

<CONTENT CONTACT HISTORY TABLE>

| LOCATION INFORMATION | CONTENT NAME | MOBILE TERMINAL ID | TIME |
|---|---|---|---|
| (35.68,139.76) | SAGA MUSEUM OFFICIAL | LDL5-CKEN-A3A3-K9Z9 | 2014-6-18 12:02:10 |
| (35.65,139.70) | SAGA ST SHOP INFO | BB6W-4M62-CUYT-W3LM | 2014-6-19 07:41:05 |
| (35.82,138.80) | OUTLET OFFICIAL | YQJR-DPP5-5GLN-HV87 | 2014-6-19 08:22:51 |
| ... | ... | ... | ... |

MOBILE TERMINAL, LOCATION INFORMATION RELATED CONTENT PROVIDING SERVER, CONTENT PANEL DISPLAY METHOD, AND MOBILE TERMINAL PROGRAM

CROSS-REFERENCE TO RELATED APPLICATION

The present application claims priority to and the benefit of Japanese Patent Application No. 2014-136341 filed on Jul. 1, 2014, the entire contents of which are incorporated herein by reference.

BACKGROUND (a) Field

The present invention generally relates to a mobile terminal, a location information related content providing server, a content panel display method, and a mobile terminal program for acquiring or providing a location information related content.

(b) Description of the Related Art

In recent years, with spread of high-performance mobile terminals called smartphones or tablets, it is explosively increased to use contents as users move. Further, contents that users expect to browse in many places are increasing.

On the other hand, many of users are currently browsing web contents using search engines, and so-called pull-type content provision in which the users see what they want to see becomes the mainstream. However, in this case, a problem that precious contents are not provided to the users occurs.

To solve this problem, a recommendation system has been developed. The recommendation system performs a recommendation using the user's attributes without performing pre-registration for the user by using acquired face image of the user.

For example, Japanese Patent Publication No. 2013-073420 discloses that a mobile terminal acquires a user's face image and extracts a feature quantity from the acquired user's face image. Then, the mobile terminal transmits the extracted feature quantity to a recommendation server. The recommendation server receives the feature quantity from the mobile terminal, stores at least a plurality of feature quantities, performs matching processing of the received feature quantity with the stored feature quantities, recommends an application or the like on the basis of the matching result, and transmits the recommendation result to the mobile terminal. The mobile terminal receives the recommendation result from the recommendation server, and displays the received recommendation result.

However, since the recommendation is performed based on individual information such as the face in the above reference, it is impossible to provide information based on environment information including a location. For example, if the mobile terminal performs the wireless communication in a store, it can be determined by the history of the wireless communication that the user was in the store or the user stayed in the store during a certain time.

SUMMARY

The present inventor has noted that a contact with the store can be determined by whether the mobile terminal uses the wireless communication or not and it is possible use the result as data about a market.

An aspect of the present invention is directed to provide a mobile terminal, a location information related content providing server, a content panel display method, and a mobile terminal program for displaying a content on the mobile terminal to induce a user to a store or facilities, and for detecting by using a wireless ID whether the user physically has contact with a store or facilities associated with the content and using the detected data for recommending a store or facilities as market data.

The present invention may provide the following aspects.

In a first aspect of the present invention, a mobile terminal communicatively connected to a location information related content providing server is provided. The mobile terminal includes a wireless communication module configured to perform a wireless communication or a short-range wireless communication, a wireless ID acquisition module configured to acquire a wireless ID of a counterpart terminal used for the wireless communication or the short-range wireless communication, a wireless ID transmission module configured to transmit the acquired wireless ID or location information acquired from the wireless ID to the location information related content providing server, a content reception module configured to receive a content that is within a predetermined range from the transmitted location information or location information identified by the transmitted wireless ID from the location information related content providing server, a content display module configured to display a link to the content on a screen, and a content contact detection module configured to detect that the user physically has contact with the content by a short-range wireless communication or location information acquisition including a scheme using the wireless ID.

According to the first aspect of the present invention, a mobile terminal communicatively connected to a location information related content providing server can perform a wireless communication or a short-range wireless communication, acquire a wireless ID of a counterpart terminal used for the wireless communication or the short-range wireless communication, transmit the acquired wireless ID or location information acquired from the wireless ID to the location information related content providing server, receive a content that is within a predetermined range from the transmitted location information or location information identified by the transmitted wireless ID from the location information related content providing server, display a link to the content on a screen, and detect that the user physically has contact with the content by a short-range wireless communication or location information acquisition including a scheme using the wireless ID.

The first aspect of the present invention relates to the mobile terminal, but may be applicable to a content display method, a mobile terminal program, and a recording medium in the same manner.

In a second aspect of the present invention, the mobile terminal further includes a direction acquisition module configured to acquire a direction to which the mobile terminal is oriented, and a positional relationship computing module configured to compute a positional relationship between the mobile terminal and the content based on location information of the mobile terminal, the direction, and the acquired location information of the content. Further, the content display module includes a content panelization module configured to display the content on a panel, a panel size determination module configured to increase a size of the panel as a distance included in the positional relationship is shorter, and a panel positioning module configured to match a direction of the panel from a reference point of the screen with a direction included in the positional relationship.

According to the second aspect of the present invention, the mobile terminal according to the first aspect can acquire a direction to which the mobile terminal is oriented, compute a positional relationship between the mobile terminal and the content based on location information of the mobile terminal, the direction, and the acquired location information of the content, increase a size of the panel as a distance included in the positional relationship is shorter, and match a direction of the panel from a reference point of the screen with a direction included in the positional relationship.

In a third aspect of the present invention, a location information related content providing server that is connected to a mobile terminal is provided. The location information related content providing server has a storage unit including a location information related content database in which information and contents are associated with each other and are stored and a content history database storing physical contacts of users with the contents. The location information related content providing server includes a wireless ID reception module configured to receive from the mobile terminal a wireless ID or location information acquired from the wireless ID, a location information identification module configured to identify the location information of the mobile terminal from the wireless ID when receiving no location information from the mobile terminal, a content extraction module configured to extract from the location information related content database a content that is within a predetermined range from the location information of the mobile terminal, a content transmission module configured to transmit the extracted content to the mobile terminal, a contact detection reception module configured to receive from the mobile terminal a detection of contact of a user with the content together with an identifier of the mobile terminal, and a contact history storage module configured to store the received detection and the identifier of the mobile terminal to the content contact history database as a contact history.

According to the third aspect of the present invention, a location information related content providing server that is connected to a mobile terminal and has a storage unit including a location information related content database in which information and contents are associated with each other and are stored, can receive from the mobile terminal a wireless ID or location information acquired from the wireless ID, identify the location information of the mobile terminal from the wireless ID when receiving no location information from the mobile terminal, extract from the location information related content database a content that is within a predetermined range from the location information of the mobile terminal, transmit the extracted content to the mobile terminal, receive from the mobile terminal a detection of contact of a user with the content together with an identifier of the mobile terminal, and store the received detection and the identifier of the mobile terminal to the content contact history database as a contact history.

In a fourth aspect of the present invention, the location information related content providing server further includes a post-contact message transmission module configured to transmit a message to be displayed on the mobile terminal by movement by a distance predefined for the content or lapse of time after receiving the detection of contact.

According to the fourth aspect of the present invention, the location information related content providing server according to third aspect can transmit a message to be displayed on the mobile terminal by movement by a distance predefined for the content or lapse of time after receiving the detection of contact.

In a fifth aspect of the present invention, the content extraction module of the location information related content providing server changes a detail of the extracted content based on a number of detections of contact that are received for the mobile terminal.

According to the fourth aspect of the present invention, the content extraction module of the location information related content providing server according the third aspect or the fourth aspect can change a detail of the extracted content based on a number of detections of contact that are received for the mobile terminal.

In a sixth aspect of the present invention, a method of displaying a content is provided by a mobile terminal communicatively connected to a location information related content providing server. The method includes performing a wireless communication or a short-range wireless communication, acquiring a wireless ID of a counterpart terminal used for the wireless communication or the short-range wireless communication, transmitting the acquired wireless ID or location information acquired from the wireless ID to the location information related content providing server, receiving a content that is within a predetermined range from the transmitted location information or location information identified by the transmitted wireless ID from the location information related content providing server, displaying a link to the content on a screen, and detecting that the user physically has contact with the content by a short-range wireless communication or location information acquisition including a scheme using the wireless ID.

In a sixth aspect of the present invention, a program for executing a content display method on a mobile terminal communicatively connected to a location information related content providing server, or a recording medium storing the program is provided. The content display method includes performing a wireless communication or a short-range wireless communication, acquiring a wireless ID of a counterpart terminal used for the wireless communication or the short-range wireless communication, transmitting the acquired wireless ID or location information acquired from the wireless ID to the location information related content providing server, receiving a content that is within a predetermined range from the transmitted location information or location information identified by the transmitted wireless ID from the location information related content providing server, displaying a link to the content on a screen, and detecting that the user physically has contact with the content by a short-range wireless communication or location information acquisition including a scheme using the wireless ID.

Aspects of the present invention can provide a mobile terminal, a location information related content providing server, a content panel display method, and a mobile terminal program for displaying a content on the mobile terminal to induce a user to a store or facilities, and for detecting by using a wireless ID whether the user physically has contact with a store or facilities associated with the content and using the detected data for recommending a store or facilities as market data.

BRIEF DESCRIPTION OF THE DRAWINGS

FIG. 9 shows an example of a location information related content table in a location information related content database 250.

FIG. 10 is an example of a contact history table in a content contact history database 251.

DETAILED DESCRIPTION

Figure 1:
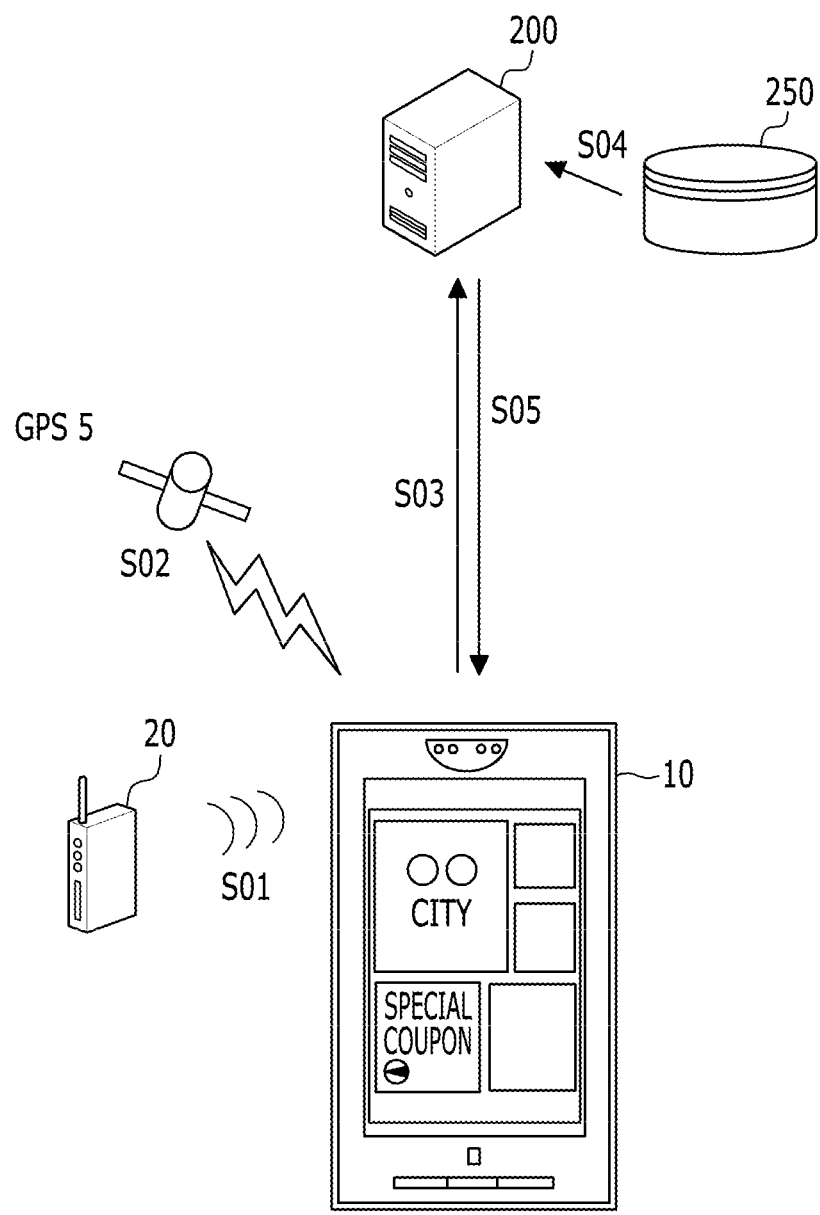
FIG. 1 is a diagram for explaining an overview of a location information related content providing system 1 according to an embodiment of the present invention.

In the following detailed description, only certain embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

Overview of Location Information Related Content Providing System 1

FIG. 1 is a diagram for explaining an overview of a location information related content providing system 1 according to an embodiment of the present invention. Referring to FIG. 1, the location information related content providing system 1 includes a mobile terminal 10 and a location information related content providing server 200.

In the location information related content providing system 1, the mobile terminal 10 performs a connection with an access point (i.e., a base station) 20 to start a wireless communication (Step S01). Further, the mobile terminal 10 acquires an IP (Internet Protocol) address or an SSID (Service Set Identifier) as an ID (IDentifier) of the access point 20 for the wireless communication.

Here, the wireless communication is not limited to a wireless LAN (Local Area Network) communication, and may be a communication through a cellular communication network. Alternatively, a short-range wireless communication such as Bluetooth, or NFC (Near Field Communication) may be used. The mobile terminal can acquire the ID (wireless ID) from a counterpart terminal used for the wireless communication, thereby using a preregistered database or a location identifying service according to the wireless communication ID to acquire location information from the wireless ID.

The mobile terminal 10 may estimate the location information according to wireless ID or may acquire the location information by using a GPS (Global Positioning System) communication (Step S02). Identifying the location information according to the GPS communication is also available at a place where the wireless communication cannot be used. It is inferior to a short-range wireless communication in accuracy, but has sufficient accuracy.

Next, the mobile terminal 10 transmits at least one of the received wireless ID, the location information acquired from the wireless ID, or the location information acquired from the GPS or the like to the location information related content providing server 200 in order to obtain a content associated with the location information from the location information related content providing server 200 (Step S03).

The location information related content providing server 200 which has received the wireless ID or the location information extracts from a location information related content database 250 the content associated with the wireless ID or the content that is within a predetermined range from the received location information (Step S04).

The location information related content providing server 200 transmits to the mobile terminal 10 the extracted content together with the location information (Step S05). In the case that the extracted content is a resource on a web, a link or an icon may be transmitted. In addition, the content may be a link to a resource such as an application or the like which is installed in the mobile terminal.

The mobile terminal 10 which has received the content displays the content as a panel on the screen (Step S06). In some embodiments, the size of each panel is changed depending on proximity between the location information of the mobile terminal 10 and the location information of the content. That is, the closer the location information of the mobile terminal 10 is to the location information of the content, the larger the size of each panel to be displayed is. In some embodiments, the position of each panel is disposed in a direction corresponding to an actual position relative to a screen center, according to the direction to which the mobile terminal 10 is oriented in addition to the location information of the mobile terminal 10 and the location information of the content.

Next, the mobile terminal 10 may detect that the mobile terminal is in contact with the content by moving and performing a wireless communication terminal 10. For example, the mobile terminal 10 may detect the contact with the content by using a coupon of cinema, performing check-in to a store by the NFC. On detecting the contact, the mobile terminal 10 may transmit its information to the location information related content providing server 200. In addition, the mobile terminal 10 may regard the content as an advertising content and compute the advertising effect from contact history.

As described above, the content associated with the current location of the user can be provided to the user by connecting the mobile terminal 10 with the access point 20, without receiving an URL (Uniform Resource Locator) from the user. The above disclosure is the overview of the location information related content providing system 1.

System Configuration of Location Information Related Content Providing System 1

Figure 2:
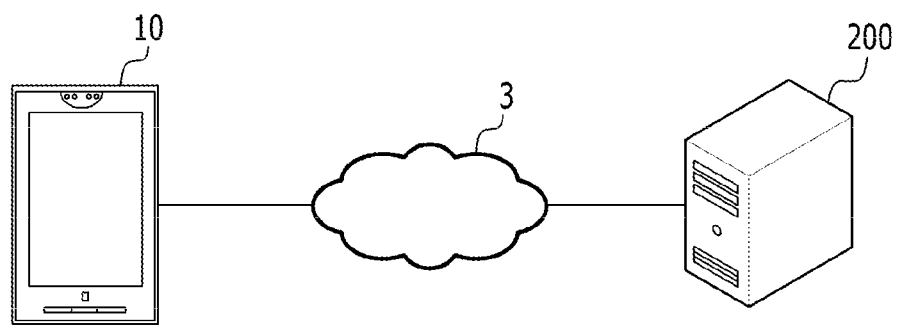
FIG. 2 is a system block diagram of a location information related content providing system 1 according to an embodiment of the present invention.

FIG. 2 is a system block diagram of a location information related content providing system 1 according to an embodiment of the present invention. Referring to FIG. 2, the location information related content providing system 1 includes a mobile terminal 10, a location information related content providing server 200, and a public network 3 (for example, an internet network, or the third generation (3G) or fourth generation (4G) communication network).

The mobile terminal 10 has functions to be described below, and can perform data communication. The mobile terminal 10 is an electric appliance for home or commercial use that can be used while a user moves with carrying it. For example, the mobile terminal 10 may be a mobile phone, a portable information terminal, or a home information appliance such as a smartphone, a tablet terminal, a netbook terminal, a slate terminal, an electronic dictionary terminal, a portable music player, or the like.

The location information related content providing server 200 has functions to be described below, and is a server for providing a URL of a content according to an ID or location information of a wireless communication terminal to which the mobile terminal 10 is connected.

Description of Each Function

Configuration of each device is described with reference to FIG. 3.

Figure 3:
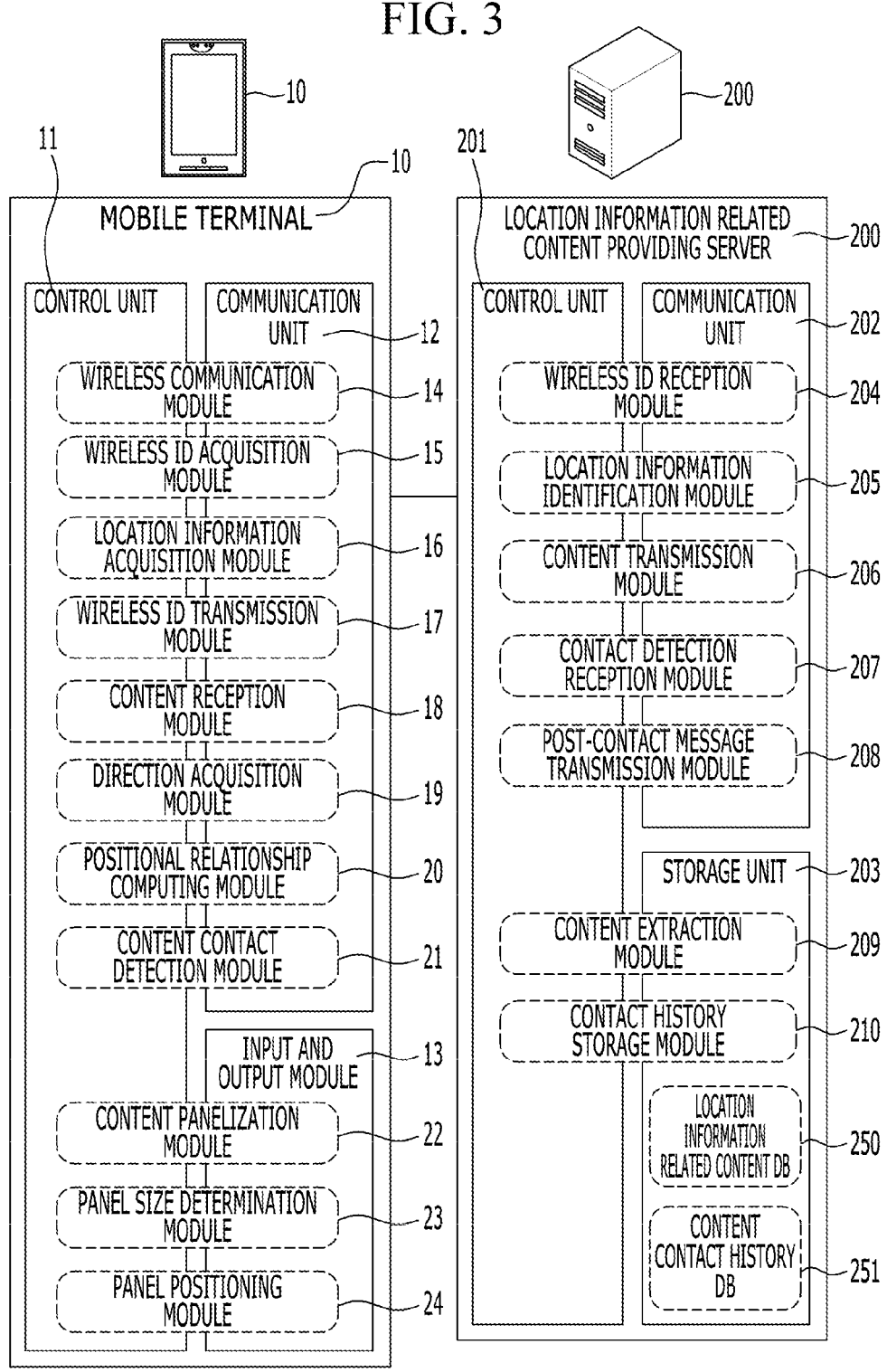
FIG. 3 is a function block diagram of a mobile terminal 10 and a location information related content providing server 200.

Referring to FIG. 3, the mobile terminal 10 includes a Central Processing Unit (CPU), a Random Access Memory (RAM), a Read Only Memory (ROM) and the like as a controller 11. The mobile terminal 10 further includes, as a communication unit 12, a device for enabling a communication with other device, for example a WiFi (Wireless Fidelity) enabled device based on IEEE 802.11.

The mobile terminal 10 includes, as an input and output unit 13, a display unit for displaying data and images controlled by the control unit 11, and further includes a touch panel, a keyboard, or a mouse for receiving an input from a user or a supporter.

In the mobile terminal 10, the control unit 11 reads a predetermined program, thereby realizing a wireless communication module 14, a wireless ID acquisition module 15, a location information acquisition module 16, a wireless ID transmission module 17, a content reception module 18, a direction acquisition module 19, a positional relationship computing module 20, and a content contact detection module 21, in cooperation with the communication unit 12. Further, in the mobile terminal 10, the control unit 11 reads a predetermined program, thereby realizing a content display module in cooperation with the input and output unit 13. The content display module includes a content panelization module 22, a panel size determination module 23, and a panel positioning module 24.

Similarly to the mobile terminal 10, the location information related content providing server 200 includes a CPU, a RAM, a ROM and the like as a control unit 201. The location information related content providing server 200 further includes, as a communication unit 202, for example, a WiFi enabled device based on IEEE 802.11, or other appliance such as a device for enabling a connection by a wire cable, and a device for realizing a data communication with a wireless access point. Furthermore, the location information related content providing server 200 further includes, as a storage unit 203 for storing data and files, a data storage unit according to a hard disk, a semiconductor memory, a recording medium, or a memory card. The storage unit 203 includes a location information related content database 250 and a content contact history database 251.

In the location information related content providing server 200, the control unit 201 reads a predetermined program, thereby realizing a wireless ID reception module 204, a location information identification module 205, a content transmission module 206, a contact detection reception module 207, and a post-contact message transmission module 208, in cooperation with the communication unit 202. Further, in the location information related content providing server 200, the control unit 201 reads a predetermined program, thereby realizing a content extraction module 209 and a contact history storage module 210 in cooperation with the storage unit 203.

Location Information Related Content Providing Process

Figure 4:
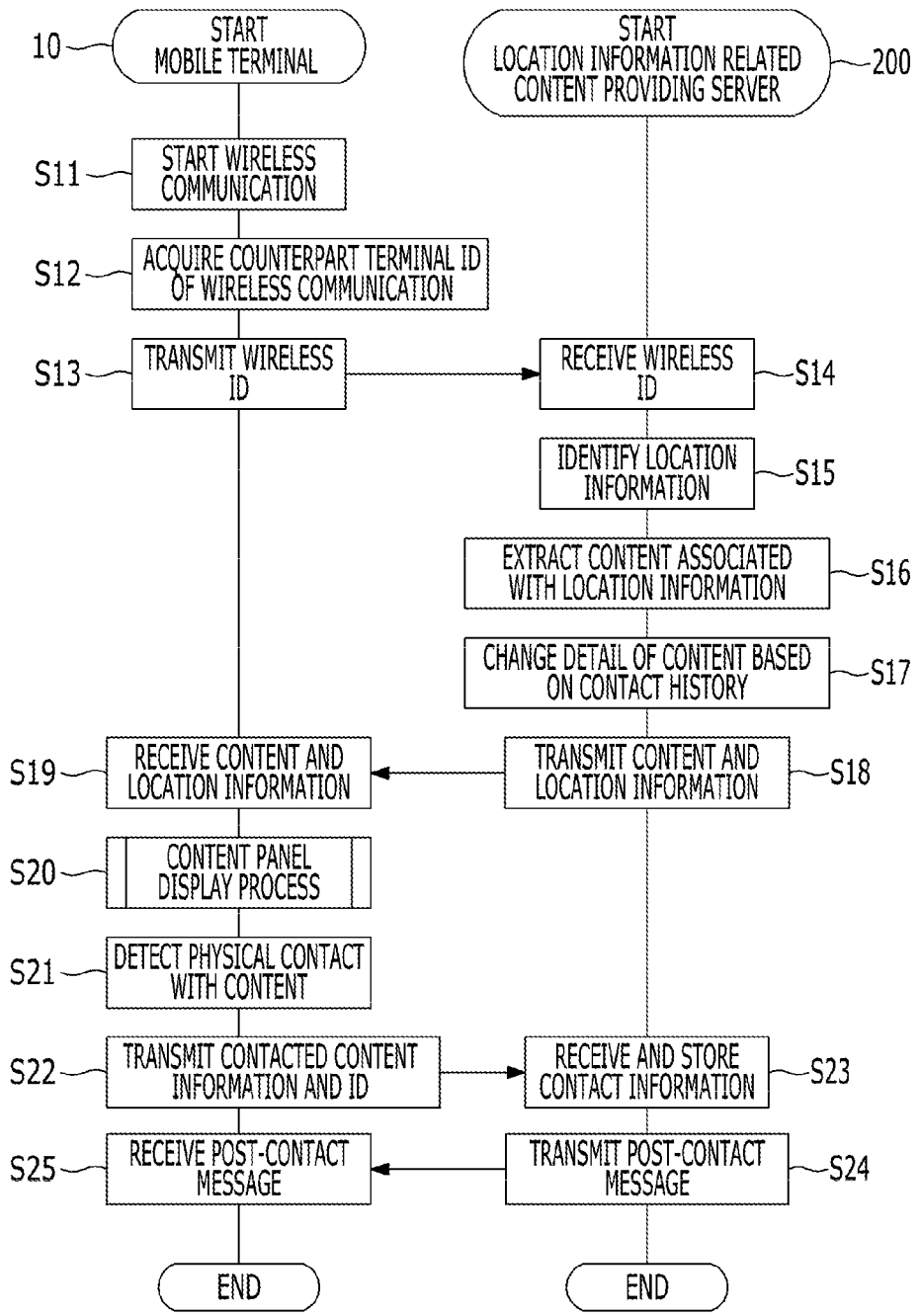
FIG. 4 is a flowchart of a location information related content providing process executed by a mobile terminal 10 and a location information related content providing server 200.

FIG. 4 is a flowchart of a location information related content providing process executed by a mobile terminal 10 and a location information related content providing server 200. Processes executed by the modules of each device described above are described in conjunction with the present procedure.

Referring to FIG. 4, first, the wireless communication module 14 of the mobile terminal 10 starts a wireless communication (Step S11). Here, the wireless communication is not limited to connect to the wireless LAN, but may be a communication through a cellular communication network, Bluetooth, iBeacon, or NFC.

Next, the wireless ID acquisition module 15 of the mobile terminal 10 acquires an ID of a counterpart terminal with which the mobile terminal 10 is communicating (Step S12). Here, there is no limitation to the type of wireless ID. The wireless ID broadly indicates information necessary to identify the wireless communication to which the mobile terminal 10 is connected. For example, if the wireless communication is the wireless LAN, an IP address or an SSID may be used as the wireless ID. If the wireless communication is the cellular communication network, a base station ID of the adjacent base station may be used as the wireless ID. If the wireless communication is the communication according to Bluetooth, iBeacon, or NFC, the mobile terminal 10 may obtain and use an ID set in the counterpart terminal or device.

Subsequently, the wireless ID transmission module 17 of the mobile terminal 10 transmits the acquired ID (i.e., a wireless ID) of the wireless communication to the location information related content providing server 200 (Step S13). In the case that the mobile terminal 10 is capable of acquiring the location information by the location information acquisition module 16 at this time, the mobile terminal 10 may directly transmit the location information.

Then, the wireless ID reception module 204 of the location information related content providing server 200 receives the wireless ID (Step S14). Then, the location information identification module 205 of the location information related content providing server 200 identifies the location information of the mobile terminal 10 on the basis of the received wireless ID (Step S15). In some embodiments, the location information identification module 205 can identify the location information from the wireless ID by using a preregistered database or a location identifying service according to the wireless ID. In some embodiments, it is not necessary to convert the wireless ID to the so-called location information such as latitude and longitude, and the wireless ID may be used as itself if it has a form that is available during extraction of the content described below.

If data about the wireless ID of the mobile terminal 10 or the history of the short range wireless communication are stored as bit data when the wireless ID or the history is acquired, the data can be accumulated as data about a questionnaire. Accordingly, the content suitable for the user can be displayed by using the accumulated data.

Next, the content extraction module 209 of the location information related content providing server 200 extracts from the location information related content database 250 a content that is within a predetermined range from the identified location information (Step S16). In some embodiments, the content is not limited to one content, and all contents that are within the predetermined range may be extracted. In some embodiments, when the number of contents to be extracted is fixed, the contents may be extracted by the fixed number in order of weight or in order of distance of the location information.

FIG. 9 shows an example of a location information related content table in a location information related content database 250. In the location information related content table, location information, IP addresses of access points, names of contents, URLs of the contents, and weights of the contents are associated with each other and are stored. The IP addresses of access points correspond to wireless IDs, and the weights correspond to priorities. In the case that the IP address of the access point is received as the wireless ID, the IP address can be handled as the location information by the location information related content table even without converting the wireless ID to the latitude and longitude.

Referring to FIG. 4 again, when the mobile terminal 10 is in contact with the extracted content, the content extraction module 209 may change a detail of the content according to the contact history with reference to the content contact history database 251 (Step S17). For example, the Limited coupon may be switched into the second or subsequent coupon, or the welcome message may be rewritten into "We look forward to your visit again." The change may be performed by a predetermined rule. Alternatively, for each of contents, the change may be separately defined in accordance with the number of contacts.

Next, the content transmission module 206 of the location information related content providing server 200 transmits to the mobile terminal 10 the extracted content together with the location information associated with the content (Step S18). The content reception module 18 of the mobile terminal 10 receives them (Step S19).

Next, the mobile terminal 10 performs a content panel display process for displaying the received content as a panel on the screen (Step S20).

Content Panel Display Process

Figure 5:
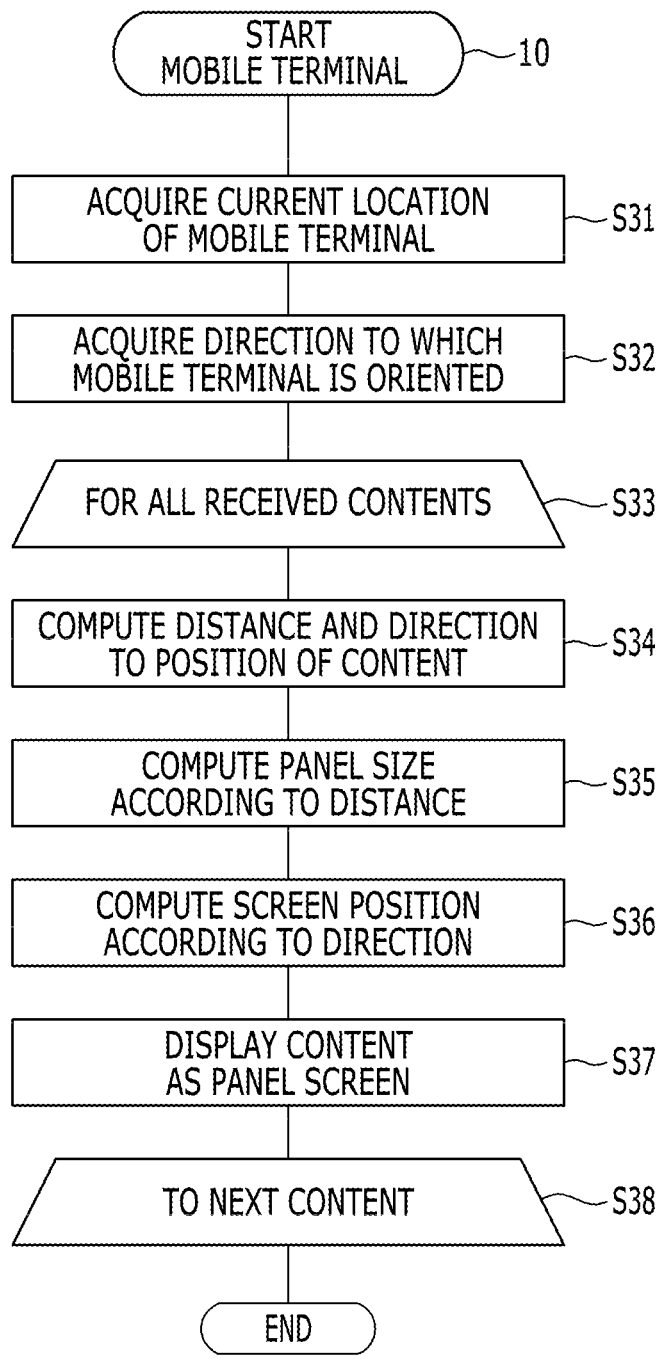
FIG. 5 is a flowchart of a content panel display process executed by a mobile terminal 10.

FIG. 5 is a flowchart of a content panel display process executed by a mobile terminal 10. Processes executed by the modules of each device described above are described in conjunction with the present procedure.

Referring to FIG. 5, first, the location information acquisition module 16 of the mobile terminal 10 acquires the current location (Step S31). In some embodiments, acquiring the current location may be performed by a wireless ID as described above. In some embodiment, acquiring the current location may be performed by using a location information acquisition service such as the GPS.

Next, the direction acquisition module 19 of the mobile terminal 10 acquires a direction in which the mobile terminal is currently oriented (Step S32). Acquiring the direction may be implemented by an electronic compass, but is not limited to this method.

Subsequently, the mobile terminal 10 repeats the following operations for all of the contents received from the location information related content providing server 200 (Step S33).

First, the positional relationship computing module 20 of the mobile terminal 10 computes a distance and a direction from the mobile terminal 10 to the content (Step S34). This computation may be performed by a step of computing the distance between the location information and a step of computing the direction of the content based on the direction of the mobile terminal 10.

Next, the panel size determination module 23 of the mobile terminal 10 determines a panel size of the content according to the distance (Step S35). Here, the content is displayed, as a panel, on the screen of the mobile terminal 10 as an icon image of a polygon including a rectangle. The shorter the distance to the content is, the content may be displayed larger on the screen of the mobile terminal 10.

Next, the panel positioning module 24 of the mobile terminal 10 determines a position of the content according to the direction (Step S36). In some embodiments, the panel positioning module 24 may determine the direction of the content that is viewed from the position of the user, from the orientation and direction of the mobile terminal 10. Therefore, a panel of the content may be displayed at the position corresponding to the direction of the actual content around the center of the screen. Not limited to the center of the screen, the panel of the content may be displayed at the position corresponding to the direction of the actual content around any position (i.e., any reference point) of the screen.

Finally, the content panelization module 22 of the mobile terminal 10 displays the content as the panel image on the screen according to the determined panel size and position (Step S37). The above operations are repeated for all of the contents (Step S38). In some embodiments, when the screen space is exhausted, the repetition may be terminated.

In some embodiments, until the panel of the content is actually drawn, only the ratio of the distance may be computed instead of determining the specific size. Alternatively, the drawing of the contents may be simultaneously carried out as if a screen layout when the contents are arranged in order of distance is determined in advance.

Figure 6:
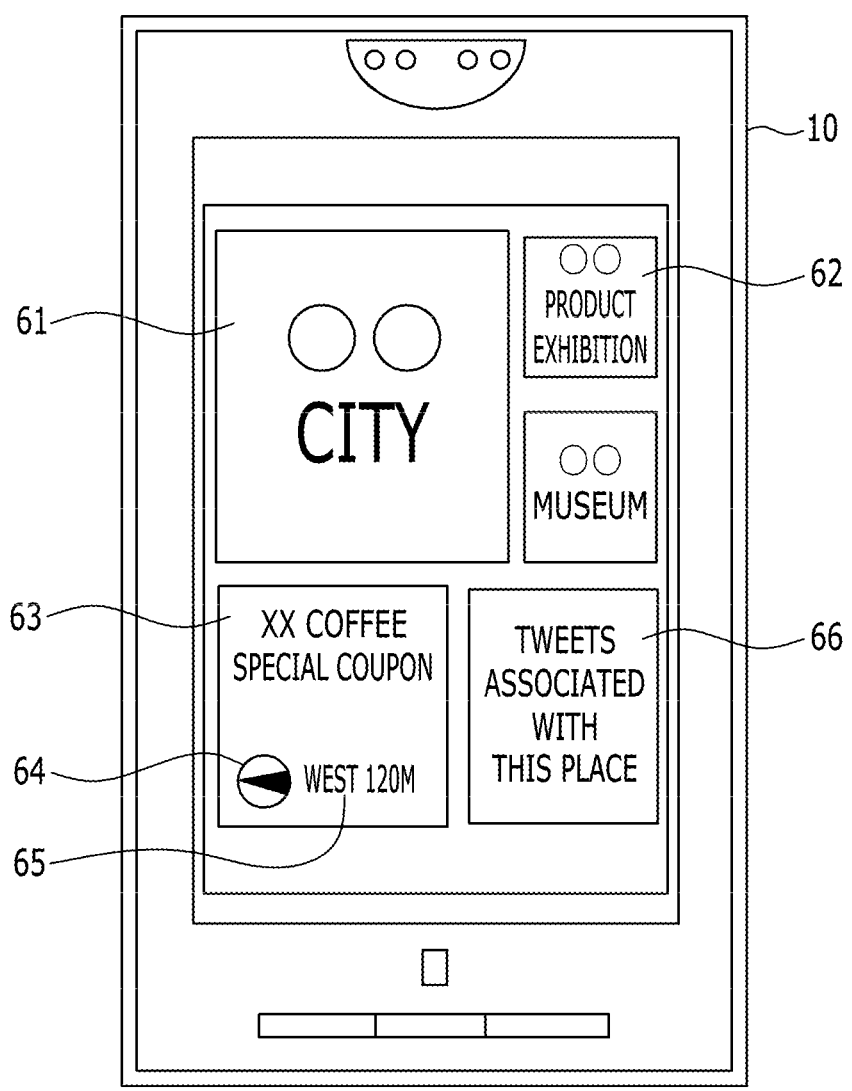
FIG. 6 is an example of a display screen of a mobile terminal 10 displaying a content panel.

FIG. 6 is an example of a display screen of a mobile terminal 10 displaying a content panel. As panels 61 and 62 shown in FIG. 6, positions of the panels 61 and 62 are changed depending to the proximity. Further, a panel 63 is located based on the direction, the direction may be shown by a compass image 64, and the specific distance may be shown a label 65. Furthermore, as a panel 66, a link for starting an application of the mobile terminal 10 with a specific parameter may be displayed.

Figure 7:
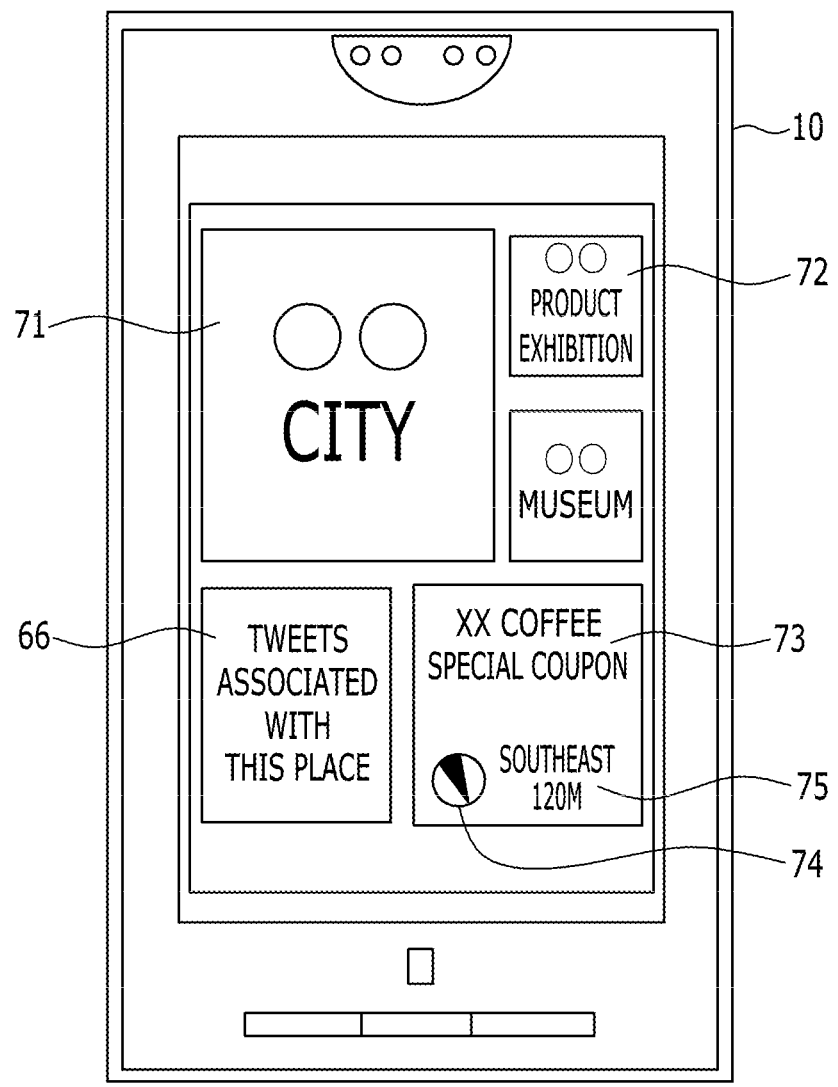
FIG. 7 is an example of a display screen of a mobile terminal 10 that displays a content as a panel after changing a direction.

FIG. 7 is an example of a display screen of a mobile terminal 10 that displays a content as a panel after changing a direction. As panels 71 and 72 shown in FIG. 7, if the content is closer than a predetermined distance or has a higher priority than a predetermined value, the content may be displayed at the upper part of a screen as an important data regardless of the direction of the mobile terminal 10. On the other hand, it is noted that the display position of the panel 73 corresponding to "XX coffee" is changed by the change of the direction. At the same time, the direction in which the compass image 74 is shown and the direction written on the label 75 are also changed. In addition, when the location information is not available for some reason, the layout may be determined according to the priority of the content and the like.

The above disclosure is a processing procedure of the content panel display process. Returning to the location information related content providing process, as shown in FIG. 4, if the content contact detection module 21 of the mobile terminal 10 determines that the mobile terminal 10 is within a predetermined range from the content, the content contact detection module 21 detect this as a physical contact with the content (Step S21).

The physical contact, for example, may be detected by determining whether the mobile terminal 10 is within the predetermined range from the content by performing a short-range wireless communication such as an NFC communication with a tag installed in association with the content or using a coupon delivered as the content. In some embodiments, the physical contact may be detected by location information acquisition of the mobile terminal 10.

For example, a scheme for acquiring the location information by using the wireless ID may be used as the location information acquisition.

Here, the content contact detection module 21 transmits to the location information related content providing server 200 the contact detection together with the contacted content and an ID of the mobile terminal 10 (Step S22).

When the contact detection reception module 207 of the location information related content providing server 200 receives the contact detection and its detailed information, the contact history storage module 210 stores them in the content contact history database 251 (Step S23).

FIG. 10 is an example of a contact history table in a content contact history database 251. Referring to FIG. 10, in the contact history table, the location information, names of the contents, and IDs of the mobile terminals that has performed the contact, times when the contact has been performed are stored. Here, the content is specified by a combination of the location information and the content name. In some embodiments, if the content has an ID, the content ID may be used instead of the content name. The contact history can be used for the change in the detail of the content as described above. For example, the detail of the content may be changed based on the number of contact detections that are received for the mobile terminal. In addition, when the content is regarded as an advertising content, the contact history may be available for estimation of advertising effectiveness or extraction of user attributes.

Note, the post-contact message transmission module 208 of the location information related content providing server 200 that has received the contact detection may a post-contact message when each of the contents satisfies a predefined condition after the contact (Step S24). Here, the mobile terminal 10 having received the post-contact message displays the message (Step S25).

For example, after contacting with a certain content, a visit questionnaire may be transmitted when the mobile terminal 10 is a predefined distance away from the contact position. That is, the visit questionnaire may be transmitted when the mobile terminal 10 moves the distance predefined for the certain content from the contact position. When viewing the movie through the use of the coupon which is the content, a message about the movie that was viewed may be transmitted after the running time of the file is elapsed.

Figure 8:
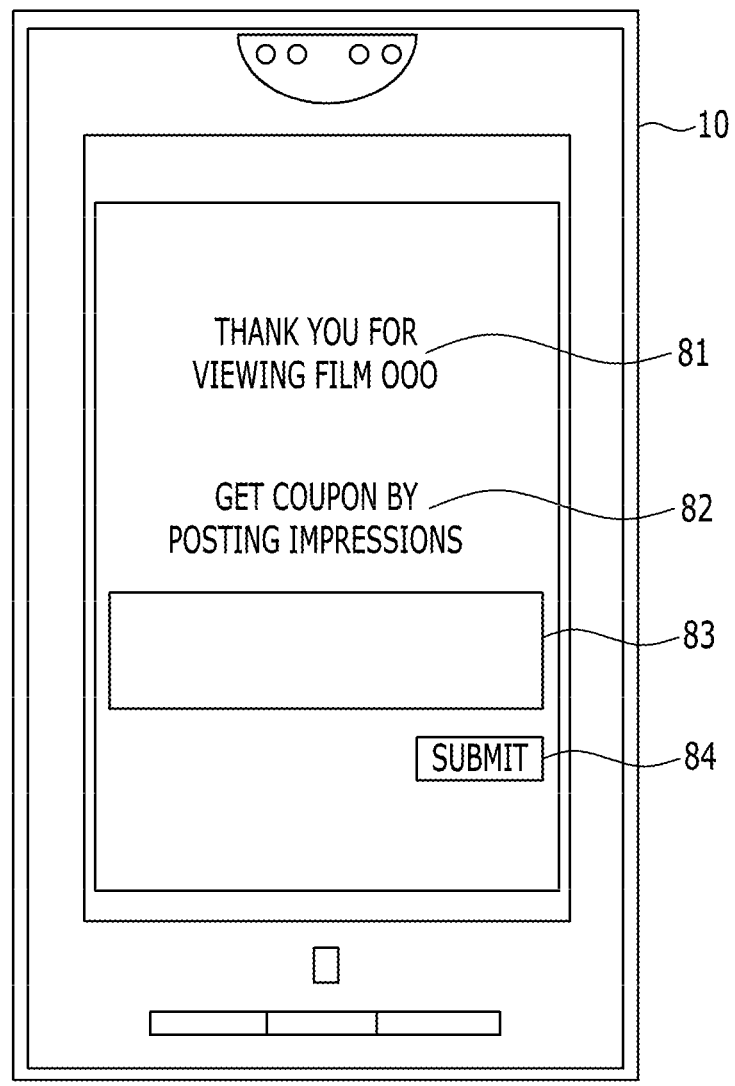
FIG. 8 is an example of a screen of a mobile terminal 10 displaying a post-contact message.

FIG. 8 is an example of a screen of a mobile terminal 10 displaying a post-contact message. In FIG. 8, a name of a specified content is entered in a message 81. In addition, a text box 83 for entering the impressions is displayed below a message 82 for prompting post of the impression. The impressions are posted on a predetermined website or social media by depressing a submit button 84. Accordingly, the efficient diffusion of information using the social media can be achieved by the targeted users who have contact with the content.

The above disclosure is the procedure of a location information related content providing process executed by the mobile terminal 10 and the location information related content providing server 200.

The above-described means and functions are realized by reading and executing a predetermined program by a computer (including a CPU, an information processing apparatus, and various terminals). The program is recorded in a (non-transitory) computer-readable recording medium, for example, a flexible disk, a CD (e.g., a CD-ROM or the like) and a DVD (e.g., a DVD-ROM, a DVD-RAM, or the like). In this case, the program is read from the recording medium by a computer and transmitted to an internal storage unit or an external storage unit to be stored and executed. Further, the program may be pre-stored in a storage unit (recording medium) such as a magnetic disk, an optical disk, or an optical magnetic disk and transmitted from the recording medium to a computer through a communications line.

While this invention has been described in connection with what is presently considered to be practical embodiments, it is to be understood that the invention is not limited to the disclosed embodiments, but, on the contrary, is intended to cover various modifications and equivalent arrangements included within the spirit and scope of the appended claims.

According to another embodiment, a mobile terminal communicatively connected to a location information related content providing server is provided. In this case, the mobile terminal may include an access point communication module for performing a communication with a wireless access point to access a public network, an IP address acquisition module for acquiring an IP address of the wireless access point or an IP address of a router connected to the wireless access point, an IP address transmission module for transmitting the acquired IP address to the location information related content providing server, an URL reception module for receiving from the location information related content providing server an URL of a content that is associated with the transmitted IP address or location information identified by the transmitted IP address, and a content acquisition module for acquiring the content designated by the received URL.

According to yet another embodiment, a location information related content providing server communicatively connected to a mobile terminal is provided. In this case, the location information related content providing server may have a storage unit including a location information related content database in which IP addresses of requestors and URLs of contents are associated with each other and are stored. Further, the location information related content providing server may include a requestor IP address reception module for receiving from the mobile terminal an IP address of the wireless access point or a router to which the mobile terminal is connected, a related content extraction module for extracting from the location information related content database an URL of a content that is associated with the received IP address, and a location information related content providing module for providing the mobile terminal with the extracted URL.

According to still another embodiment, the storage unit of the location information related content providing server may further have a location related content database in which location information of requestors and URLs of contents are associated with each other and are stored. The location information related content providing server may further include a location information identification module for identifying a location of the mobile terminal based on the received IP address, and a proximity content extraction module for extracting from the location related content database an URL of a content that is associated with location information within a predetermined range from the identified location. The extracted URL may be provided to the mobile terminal.

According to a further embodiment, a method of acquiring a location information related content may be provided by a mobile terminal communicatively connected to a location information related content providing server. In this case, the method may include acquiring an IP address of a wireless access point or a router being used to access a public network, transmitting the acquired IP address to the location information related content providing server, receiving from the location information related content providing server an URL of a content that is associated with the transmitted IP address or location information identified by the transmitted IP address, and acquiring the content designated by the received URL.

According to a still further embodiment, a recording medium that stores a program for executing an location information related content acquiring method on a mobile terminal that is communicatively connected to an location information related content providing server may be provided. In this case, the location information related content acquiring method may include acquiring an IP address of a wireless access point or a router being used to access a public network, transmitting the acquired IP address to the location information related content providing server, receiving from the location information related content providing server an URL of a content that is associated with the transmitted IP address or location information identified by the transmitted IP address, and acquiring the content designated by the received URL.

What is claimed is:

1. A mobile terminal communicatively connected to a location information related content providing server, the mobile terminal comprising:
   a wireless communication module configured to perform a wireless communication or a short-range wireless communication;
   a wireless ID acquisition module configured to acquire a wireless ID of a counterpart terminal used for the wireless communication or the short-range wireless communication;
   a wireless ID transmission module configured to transmit the acquired wireless ID or location information acquired from the wireless ID to the location information related content providing server;
   a content reception module configured to receive a content that is within a predetermined range from the transmitted location information or location information identified by the transmitted wireless ID from the location information related content providing server, the content being extracted from a plurality of contents included in a database of the location information related content providing server and each of the plurality of contents being associated with its location information;
   a content display module configured to display the content or a link to the content on a screen;
   a content contact detection module configured to detect that the user physically has contact with the content by a short-range wireless communication or location information acquisition including a scheme using the wireless ID;
   a direction acquisition module configured to acquire a direction to which the mobile terminal is oriented; and
   a positional relationship computing module configured to compute a positional relationship between the mobile terminal and the content based on location information of the mobile terminal, the direction, and the acquired location information of the content,
   wherein the content display module comprises:
      a content panelization module configured to display the content or the link on a panel;
      a panel size determination module configured to increase a size of the panel as a distance included in the positional relationship is shorter; and
      a panel positioning module configured to match a direction of the panel from a reference point of the screen with a direction included in the positional relationship.

2. A method of displaying a content by a mobile terminal communicatively connected to a location information related content providing server, the method comprising:
   performing a wireless communication or a short-range wireless communication;
   acquiring a wireless ID of a counterpart terminal used for the wireless communication or the short-range wireless communication;
   transmitting the acquired wireless ID or location information acquired from the wireless ID to the location information related content providing server;
   receiving a content that is within a predetermined range from the transmitted location information or location information identified by the transmitted wireless ID from the location information related content providing server, the content being extracted from a plurality of contents included in a database of the location information related content providing server and each of the plurality of contents being associated with its location information;
   displaying content or a link to the content on a screen;
   detecting that the user physically has contact with the content by a short-range wireless communication or location information acquisition including a scheme using the wireless ID;
   acquiring a direction to which the mobile terminal is oriented; and
   computing a positional relationship between the mobile terminal and the content based on location information of the mobile terminal, the direction, and the acquired location information of the content,
   wherein displaying the content or the link to the content comprises:
      displaying the content or the link on a panel;
      increasing a size of the panel as a distance included in the positional relationship is shorter; and
      matching a direction of the panel from a reference point of the screen with a direction included in the positional relationship.

3. A non-transitory recording medium that stores a program for executing a content display method on a mobile terminal communicatively connected to a location information related content providing server, the method comprising: performing a wireless communication or a short-range wireless communication; acquiring a wireless ID of a counterpart terminal used for the wireless communication or the short-range wireless communication; transmitting the acquired wireless ID or location information acquired from the wireless ID to the location information related content providing server; receiving a content that is within a predetermined range from the transmitted location information or location information identified by the transmitted wireless ID from the location information related content providing server; displaying the content or a link to the content on a screen; and detecting that the user physically has contact with the content by a short-range wireless communication or location information acquisition including a scheme using the wireless ID; acquiring a direction to which the mobile terminal is oriented; and computing a positional relationship between the mobile terminal and the content based on location information of the mobile terminal, the direction, and the acquired location information of the content, wherein displaying the content or the link to the content comprises: displaying the content or the link on a panel; increasing a size of the panel as a distance included in the positional relationship is shorter; and matching a direction of the panel from a reference point of the screen with a direction included in the positional relationship.

* * * * *